Aug. 19, 1958
H. A. TOULMIN, JR
2,848,055
SELF CONTAINED POWER AXLE
Filed Oct. 14, 1954
4 Sheets—Sheet 1
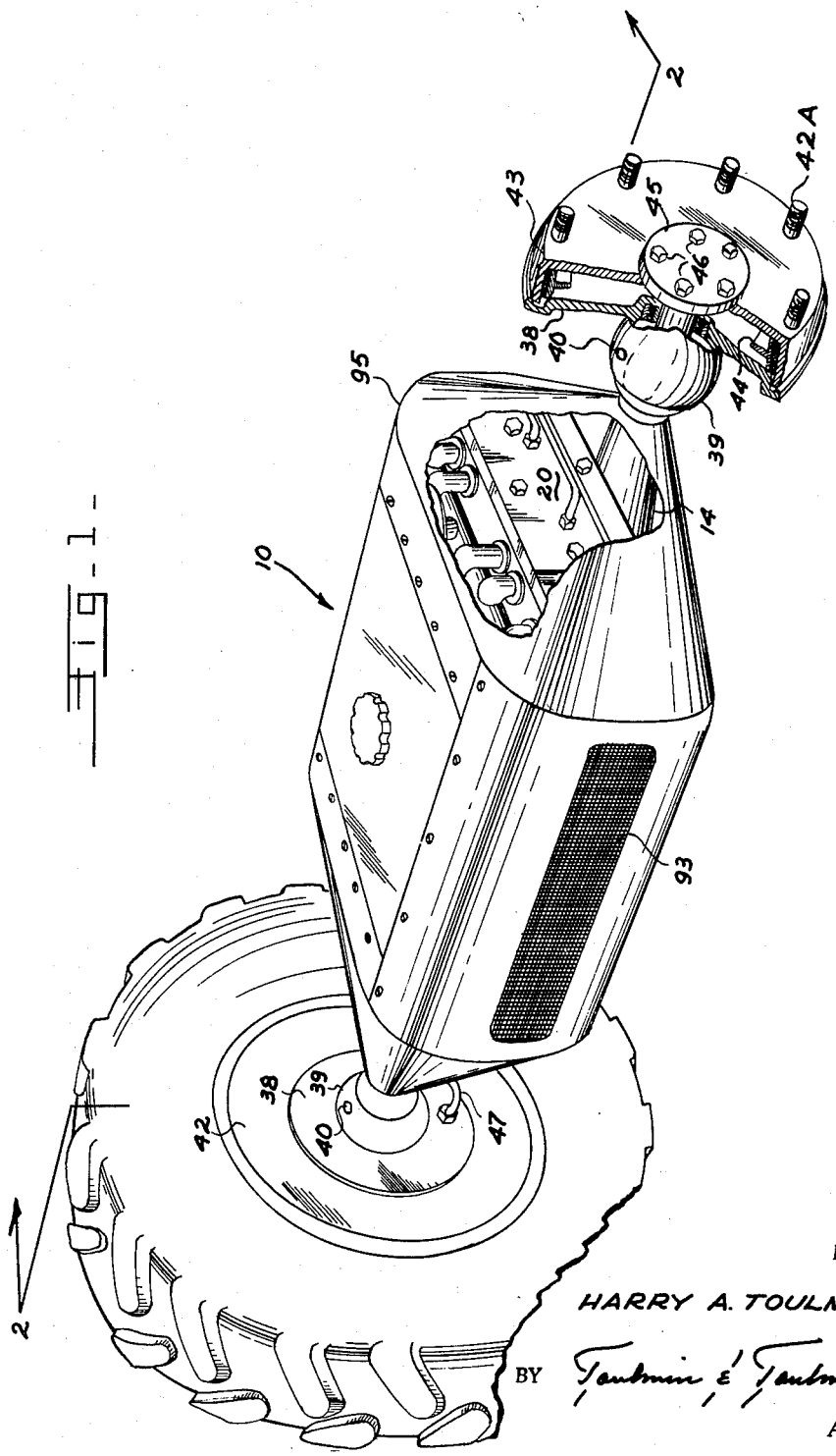
INVENTOR
HARRY A. TOULMIN JR
BY *Toulmin & Toulmin*
ATTORNEYS

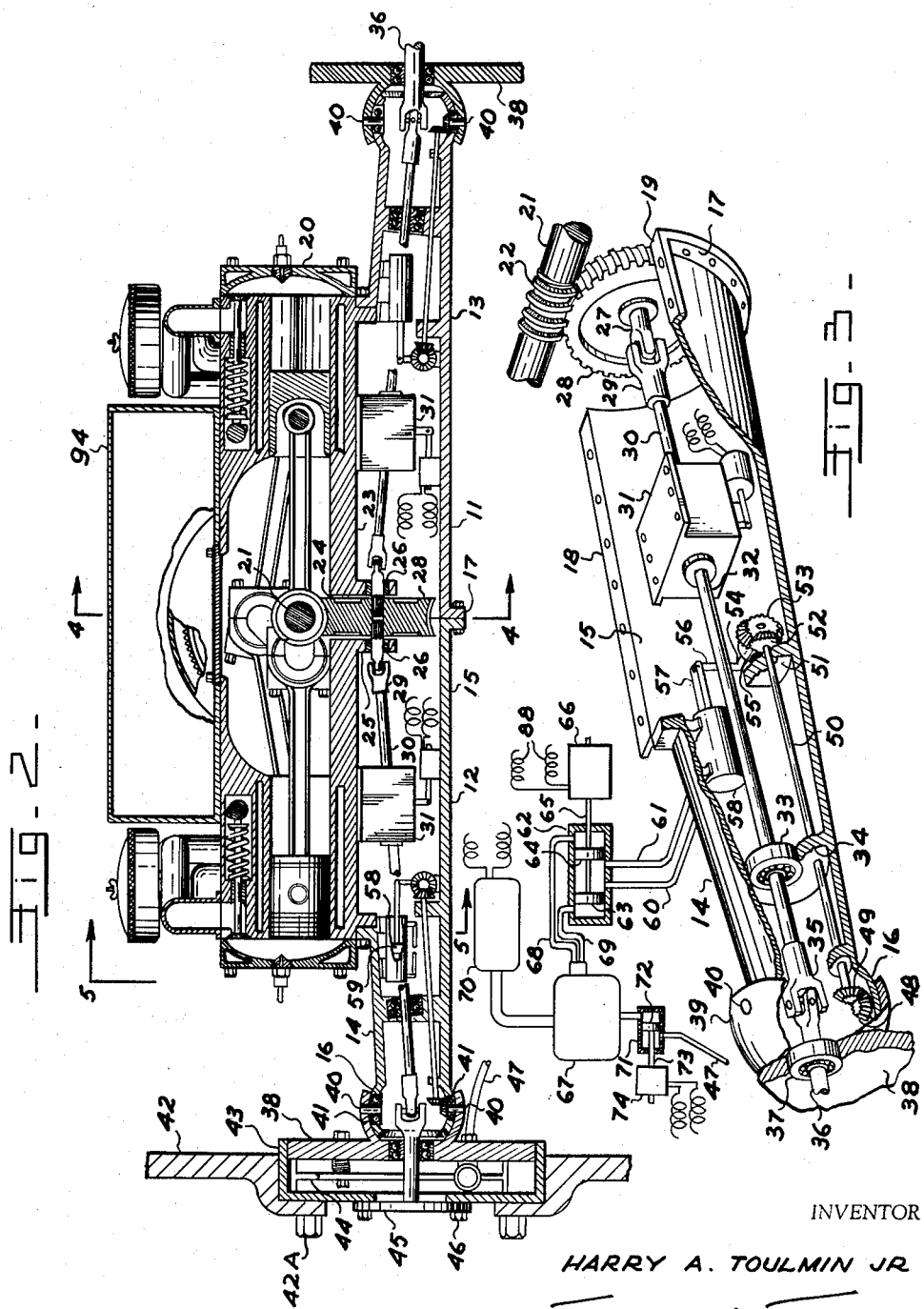

Aug. 19, 1958  H. A. TOULMIN, JR  2,848,055
SELF CONTAINED POWER AXLE
Filed Oct. 14, 1954  4 Sheets-Sheet 3
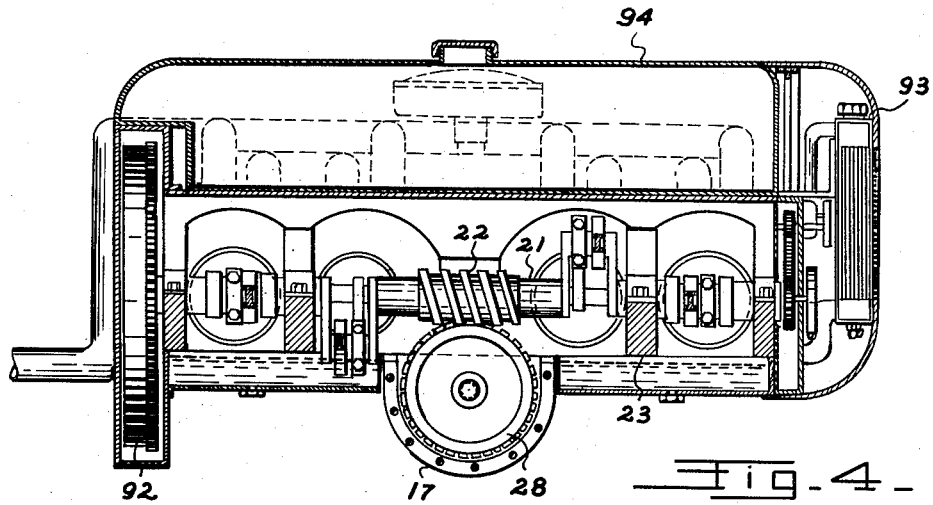
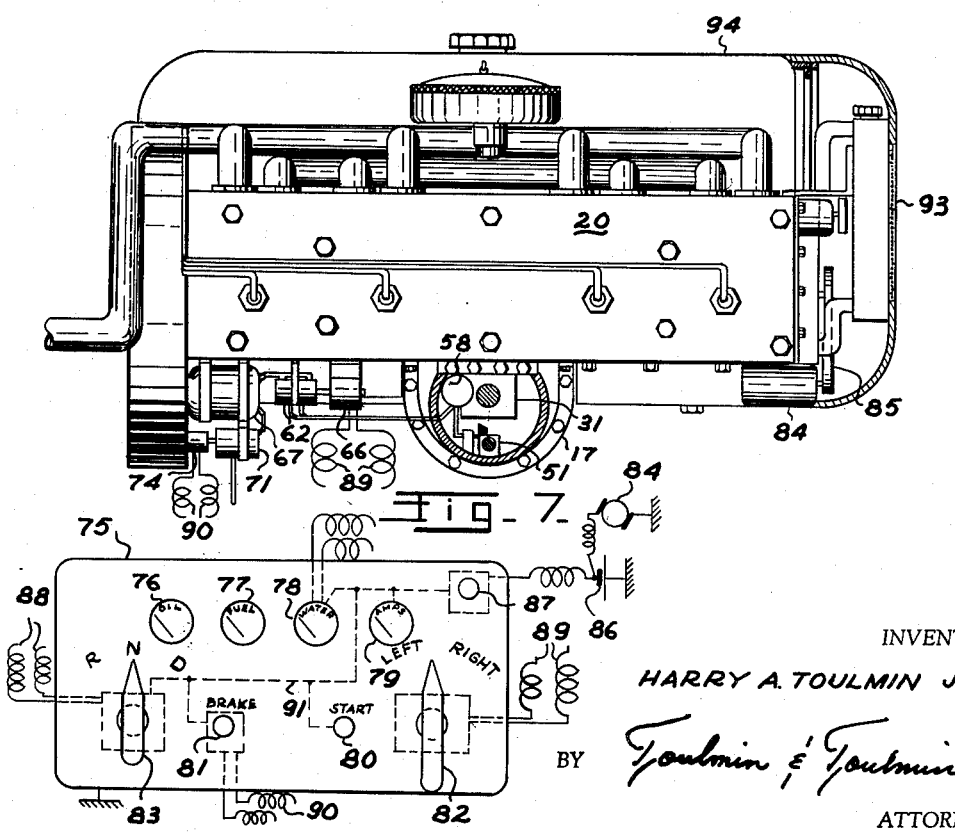
INVENTOR
HARRY A. TOULMIN JR.
BY
ATTORNEYS

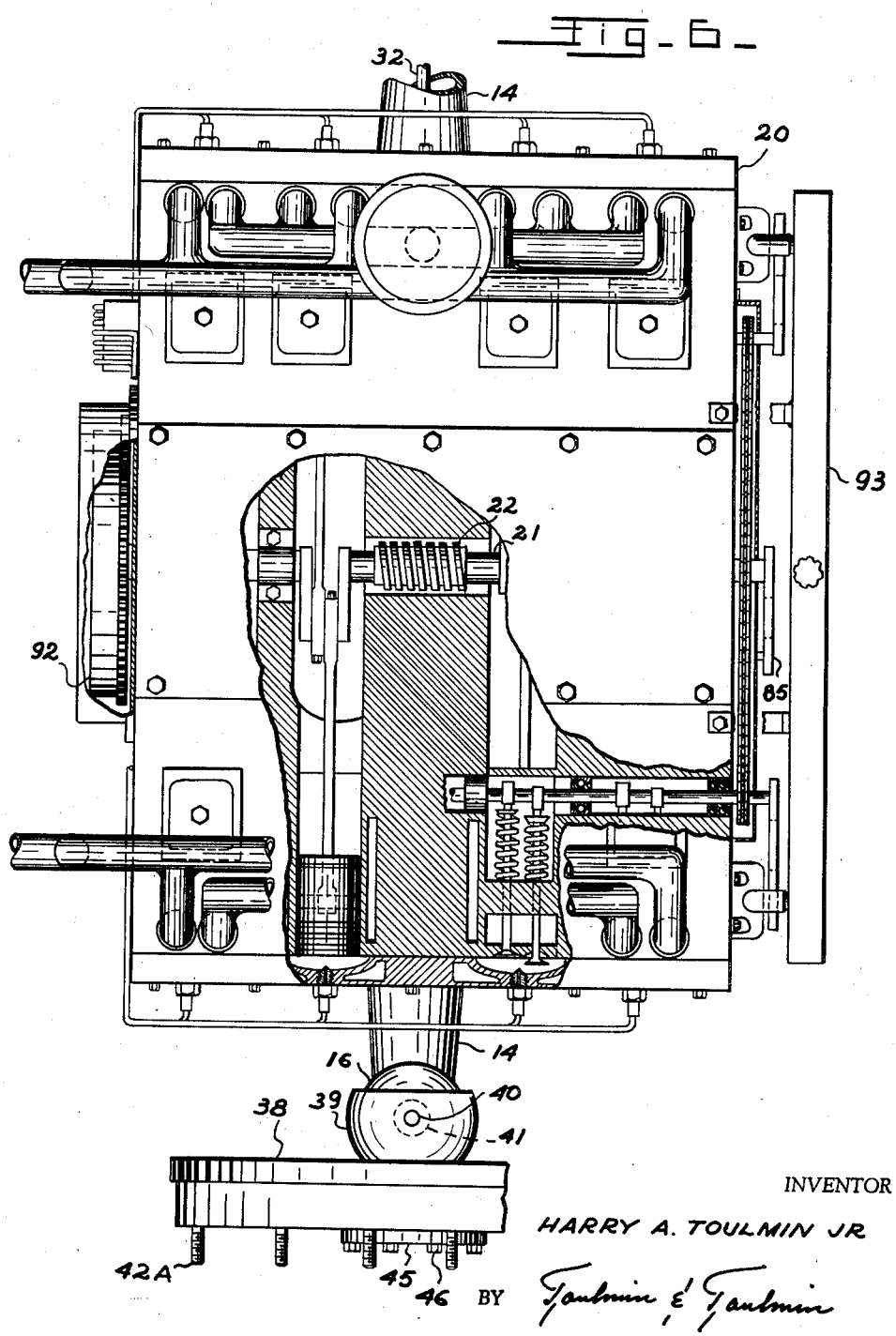

United States Patent Office 2,848,055
Patented Aug. 19, 1958

2,848,055

SELF CONTAINED POWER AXLE

Harry A. Toulmin, Jr., Dayton, Ohio, assignor to The Commonwealth Engineering Company of Ohio, Dayton, Ohio, a corporation of Ohio Application October 14, 1954, Serial No. 462,307

4 Claims. (Cl. 180—12)

The present invention relates to a prime mover, more particularly, to a power axle that has a power source and steering apparatus combined in a single wheeled unit.

Considerable work has been done in the past in devising new and improved forms of power units. The present invention is directed to that type of power unit which essentially comprises an axle member with wheels mounted on each end. A suitable form of power means is mounted upon the axle member in order to drive the wheels. This combined power unit may be designated as a power axle. This power axle may be readily adapted to be used with vehicles of all kinds—those which are intended to run on roads, special runways or rails.

For reasons of economy it has been desired to make this power axle as light and as compact as possible so that it will take up the minimum amount of space. It is intended that this power axle be mounted on a vehicle in order to power the vehicle without resorting to any mechanism external of the power axle. Provision is usually made for controlling the power axle by employing a suitable control means which may be easily connected to the power axle.

It is pointed out, however, that the power axles of the prior art are constructed to only power the wheels. Consequently, the use of these power axles is limited to being the rear axle of automobiles or they may be used on vehicles adapted to run on tracks where it is not necessary to steer the vehicle. In those few cases where some provision has been made for steering a vehicle equipped with power axles, it is usually necessary to pivot the entire power axle in order to change the direction of the vehicle. It would be greatly desirable to provide a power axle wherein the wheels are both powered and steered by mechanism which is included entirely within the axle.

The present invention discloses a power axle wherein both a prime mover and steering mechanism are combined in a compact power axle. Steering of the wheels on the power axle of this invention is achieved in the same manner as the front wheels of an ordinary automobile are steered; that is to say, the wheels are mounted upon steering knuckles which, in turn, are pivotally mounted on the ends of an axle member. Transmission means are provided to drivingly connect the wheels with a prime mover and a steering mechanism is also provided to pivot the steering knuckles thereby to steer the wheels.

This invention essentially comprises a hollow axle member which has an engine mounted thereupon. The mechanism for steering the wheels is mounted within the hollow axle member. Power transmission means drivingly connecting the wheels and the engine are mounted within the axle member. The accessories necessary to operate the engine are compactly arranged about the engine and axle member. The entire assemblage is then enclosed with a light-weight metal and the appearance is that of a single axle. This single axle comprises a complete power and steering unit which may be readily attached to any form of vehicle desired. Consequently, this unit may be used to both power and steer a vehicle. As such the adaptability of vehicles equipped with the power axle of this invention is greatly increased.

It is therefore the principal object of this invention to provide an improved form of a prime mover.

It is another object of this invention to provide a power axle embodying a prime mover and steering apparatus in a single unit.

It is a further object of this invention to provide a power axle which is readily adapted to be used to both power and steer a vehicle or the like.

It is an additional object of this invention to provide a power axle employing an internal combustion engine as a prime mover.

It is still another object of this invention to provide a power axle utilizing a hydraulic system for steering and braking purposes.

It is a still further object of this invention to provide an integrated power unit which may be used to drive, steer and brake a vehicle equipped with this unit.

It is still an additional object of this invention to provide a two wheeled power unit which has both a prime mover and a steering apparatus combined therein.

Other objects and advantages of this invention will become apparent upon reference to the following description when taken in conjunction with the accompanying drawings wherein:

Fig. 1 is an over-all perspective view of this invention with one wheel removed and a portion of the casing cut away in order to show the arrangement of parts within the axle;

Fig. 2 is a sectional view taken along the lines 2—2 of Fig. 1;

Fig. 3 is a cut-away view of a portion of the axle member showing the steering and power transmitting mechanism in detail;

Fig. 4 is a sectional view taken along the lines 4—4 of Fig. 2;

Fig. 5 is a sectional view taken along the lines 5—5 of Fig. 2;

Fig. 6 is a top plan view of the power axle with the casing removed and portions of the axle cut away; and Fig. 7 is a view of the control panel employed with this power unit.

Returning now to the drawings, more particularly to Fig. 1 wherein like reference symbols indicate the same parts throughout the various views, 10 indicates generally a power axle constructed in accordance with this invention. The power axle 10 comprises a hollow axle 11 which consists of two axle halves 12 and 13. The axle halves 12 and 13 are similar in construction. Consequently, only axle half 12 will be described in detail.

The axle half 12 consists of a cylindrical axial portion 14 which is integral to and extends outwardly from a semi-cylindrical portion 15. There is a ball joint 16 on the free end of the cylindrical axial portion 14 to receive a wheel. This construction will be described in detail later. There is an external flange 17 at the free end of the semi-cylindrical portion 15. There are flanges 18 and 19 along the longitudinal edges of the semi-cylindrical portion 15.

The two axle halves 12 and 13 are assembled into the axle member 11 by bolting together the external flanges 17 of the respective axle halves.

Upon the longitudinal flanges 18 and 19 of the axle member 11 there is mounted an engine 20. In the embodiment of the invention described herein the engine 20 comprises an opposed eight-cylinder diesel engine of the horizontal type. The diesel engine is conventional in construction and need not be described in detail. The relationship of the diesel engine with the axle member will, however, be pointed out in detail.

The opposed pistons of the diesel engine drive a crank shaft 21 which has a worm gear portion 22 thereon. The crank shaft 21 is suitably journalled at each end in the walls of the diesel engine.

The diesel engine 20 has a bottom wall 23 which is positioned upon and secured to the longitudinal flanges 18 and 19 of the axial member 11. There is an opening 24 in the bottom wall 23 and depending on opposite sides of the opening are support portions 25 in which are supported bearings 26. A shaft 27 is journalled upon the bearings 26 and a gear wheel 28 is fixed upon the shaft 27. The gear wheel 28 is in mesh with the worm gear portion 22 on the crank shaft. There is a universal joint 29 upon each end of the shaft 27. A drive shaft 30 is connected to the universal joint 29 and extends into a clutch housing 31. The clutch housing 31 encases a single speed reversible transmission and an actuating clutch which are employed to either connect or disconnect the prime mover from the wheels. It is pointed out, however, that any type of clutch or transmission desired may be employed in the clutch housing 31.

Extending outwardly from the opposite side of the clutch housing 31 is a driven shaft 32 which is rotatably journalled in a bearing 33 supported in a partition 34 which is formed in the cylindrical axle portion 14. The driven shaft extends into the ball joint 16 where there is mounted on the end of the shaft a universal joint 35. The universal joint 35 is splined upon the end of the shaft 32 so that the universal joint may be withdrawn from the shaft. Extending outwardly from the driven shaft 32 and connected to the universal joint 35 is a spindle 36. The spindle 36 is rotatably journalled in a bearing 37 which is mounted in the brake backing plate 38. The brake backing plate 38 has a socket 39 thereon which is adapted to receive the ball joint 16 in order to form a ball and socket joint. The socket 39 is pivoted upon the ball joint 16 by means of pins 40 which are axially aligned. Bearings 41 are employed to rotatably journal the pins 40. It is pointed out that the axes of the pins 40 and the universal joint 35 are in alignment.

A suitable wheel 42 is secured to the free end of the spindle 36. As illustrated in Fig. 1 wheel 42 is equipped with a large balloon tire such as commonly employed in tractors. However, it is to be understood that any desired type of wheel which is suitably attached to the spindle may be readily employed. The wheel 42 is fastened by bolts 42A to a brake drum 43 which is adapted to engage a brake mechanism 44, which is mounted upon the brake backing plate 38.

The wheel assembly as illustrated in Fig. 2 is that conventionally used in trucks. A disc 45 which is integral with the end of the spindle 36 is secured to the brake drum 43 by means of a plurality of bolts 46. By removing the bolts 46 the spindle may be withdrawn from the end of the driven shaft 32 since the universal joint 35 is splined to the end of the driven shaft 32. The wheel 42 is removed by unfastening the bolts 42A. A brake line 47 leads from the hydraulic braking mechanism to the brake mechanism 44 located in the brake drum 43.

As pointed out previously, the driving mechanism structure and wheel structure of both axle halves are similar.

In order to steer the wheel 42, that is, to pivot the wheel about the aligned axes of the pins 40, a bevel gear 48 is fixed upon the inner end of the lower pin 40. The bevel gear 48 engages a second bevel gear 49 which is fixed to the end of a shaft 50 which is journalled in the partition 34 and a second partial partition 51. At the inner end of the shaft 50 there is another bevel gear 52 which engages a further bevel gear 53 which is secured to a shaft 54 which is journalled in a projection 55 which rises upwardly from the bottom wall of the axle half 12.

There is a vertically upright arm 56 integrally attached to the free end of the shaft 54. The arm 56 is connected by means of a pin to a piston arm 57 which extends outwardly from a hydraulic cylinder 58. There is a double acting piston 59, slidably mounted within the hydraulic cylinder 58 and conected to the inner end of the piston arm 57. Hydraulic lines 60 and 61 lead from the hydraulic cylinder 58 from each side of the double acting piston 59. The hydraulic lines 60 and 61 lead to a master hydraulic steering cylinder 62 in which are slidably mounted pistons 63 and 64 which, in turn, are secured to a piston arm 65. The piston arm 65 is actuated by a steering solenoid 66. The hydraulic pump 67 furnishes hydraulic fluid through the lines 68 and 69 to the outer faces of the pistons 63 and 64. The hydraulic pump 67 is operated by a conventional electric motor or the like 70.

With the above description of the steering mechanism in mind, it can be seen that steering of the wheel 42 is achieved by permitting the flow of hydraulic fluid into either line 60 or 61 depending upon the direction it is desired to turn the wheel. By permitting hydraulic fluid under pressure to flow into the line 60 or 61 the piston 59 is moved in one direction and this, in turn, causes the bevel gear 53 to rotate. This rotation of the bevel gear 53 subsequently causes the shaft 50 to rotate and this rotative motion is, in turn, transmitted to the bevel gear 48 which is located upon the lower pin 40. As the pin 40 is secured to the socket 39, it can be seen that rotation of the pin 40 will cause the wheel 42 to pivot about the aligned axes of the pins 40.

In order to brake the wheel 40, a brake line 47 leads to a brake cylinder 71 in which is located a piston 72 secured to a piston arm 73 which is actuated by a solenoid 74. Actuation of the solenoid 74 to achieve braking will result in the piston 72 being moved to the left as viewed in Fig. 3 and this, in turn, will permit hydraulic fluid under pressure to flow through the brake line 47 and actuate the brake mechanism 44.

In order to control and operate the power axle 10 a control panel such as illustrated in Fig. 7 may be used. In Fig. 7 there is illustrated a control panel 75 which has mounted thereon the conventional instruments, such as the oil pressure gage 76, the fuel gage 77, water temperature gage 78 and ammeter 79. The control structure for the power axle itself is simple in structure and consists of a starter button 80 and a brake button 81 which is a switch in order to actuate the brake solenoid 74. Steering is accomplished by selectively moving switch arm 82, which serves to actuate solenoid 66. The movement of the piston arm 65 will depend upon the direction that the switch arm is moved. The direction of movement of the piston arm is coordinated with the designations placed on the control panel adjacent the switch arm.

To control the prime mover a power switch arm 83 is provided. The power switch arm 83 has three positions, neutral, drive and reverse. Movement of the switch arm 83 to achieve the desired direction of drive will result in actuation of the clutch solenoid located adjacent the clutch housing 31. The clutch, in turn, actuates a conventional simplified transmission which provides forward, reverse and neutral positions. Both clutches are actuated simultaneously by movement of the power switch arm 83. However, if desired, the control panel may be so connected that one or the other of the clutches may be selectively actuated.

The electrical system of the power axle 10 comprises a generator 84, which is driven by a belt drive 85 from the diesel engine. The generator 84 charges a battery 86. An ignition switch 87 is placed in the line to the power switch and is mounted on the control panel 75. The power switch 83 has leads 88 which are connected to the clutch solenoid. Leads 89 are connected from the steering switch to the steering solenoid 66. Leads 90 extend from the brake switch to the brake solenoid 74. The brake switch and starter button are both energized from the line 91 which leads from the power switch 83 to the ignition 87.

The starter button 80 operates a conventional electric self-starter which turns over a fly wheel 92, which is connected to the crank shaft 21 of the diesel engine. The diesel engine is preferably of the type which started as an internal combustion engine and then changed to diesel operation when a designated cylinder temperature has been attained.

In order to cool the engine, a radiator 93 is provided at the front of the power axle 10. The water circulating system is of the conventional type and need not be described. A fuel tank 94 is mounted above the diesel engine with the filler cap extending above the upper surface of the power axle 10. A casing 95 of a light weight metal, preferably aluminum or the like, encloses all the components of the power axle.

It is to be understood that many modifications may be made in the described embodiment of this invention without departing from the scope thereof. For instance, the components may be arranged in such a manner that the axle casing is tubular in shape. Also other forms of a prime mover may be employed. These forms may include a conventional internal combustion engine or a suitable gas turbine. The described embodiment, however, clearly sets forth the principles of this invention.

Thus it can be seen that the present invention discloses an integrated power axle which has a source of driving power and a steering mechanism mounted therein. Vehicles equipped with the power axle as described in this invention will be more adaptable in that a single integrated unit is provided by which the vehicle may be both driven and steered. This power axle may be employed in any type of wheel vehicle.

It will be understood that this invention is susceptible to modification in order to adapt it to different usages and conditions, and, accordingly, it is desired to comprehend such modifications within this invention as may fall within the scope of the appended claims.

What is claimed is:

1. In a self-contained power axle for driving a motor vehicle, a hollow axle comprising a pair of axle halves with each said axle half comprising a cylindrical axle portion extending outwardly from a semi-cylindrical portion, said semi-cylindrical portions being joined together to form a single hollow axle having an open portion, ball joints on the outer ends of said cylindrical axle portions, sockets pivotally mounted on each of said ball joints, there being wheels rotatably mounted on each of said sockets, means within each of said ball and socket joints for steering said wheels, a hydraulic system for actuating said steering means, an opposed piston engine disposed in a horizontal plane mounted on the open portion of said axle above the joined semi-cylindrical portions, driveshafts within said axle halves to transmit power from said engine to each of said wheels, and a covering enclosing said engine and said cylindrical axle portions to form a self-contained power axle unit, whereby the vertical dimension is materially less than the horizontal dimension to permit low center of gravity vehicle bodies to be mounted on said power unit.

2. In a self-contained power axle for driving a motor vehicle, a hollow axle having a centrally located open portion, ball joints on the ends of said axle, sockets pivotally mounted on each of said ball joints, there being a wheel pivotally mounted on each of said sockets, means within said ball and socket joint for steering said wheels, a hydraulic motor for actuating said steering means, an opposed piston engine disposed in a horizontal plane mounted on the open portion of said axle with the axes of the engine pistons being substantially parallel to the longitudinal axis of said hollow axle, said engine driving a worm whose axis extends transversely of the axis of said axle, a worm gear in said open portion of said axle and drivingly engaged by said worm, a driveshaft extending from each side of said worm gear within said hollow axle to each of said wheels, clutch means in each of said driveshafts to connect and disconnect said internal combustion engine from said wheels, a fuel tank mounted upon said internal combustion engine, and a covering enclosing said fuel tank, internal combustion engine cylindrical and semi-cylindrical axle portions to form a self-contained power axle unit, whereby the vertical dimension is materially less than the horizontal dimension to permit low center of gravity vehicle bodies to be mounted on said power unit.

3. In a self-contained power axle for driving a motor vehicle, a hollow axle comprising a pair of axle halves with each said axle half comprising a cylindrical axle portion extending outwardly from a semi-cylindrical portion, said semi-cylindrical portions being joined together to form a single hollow axle having an open portion, an opposed piston engine disposed in a horizontal plane mounted on the open portion of said axle above the joined semi-cylindrical portions, wheels pivotally mounted on the outer ends of said single hollow axle, means within said axle for steering said wheels, and drive shafts within said axle halves to transmit power from said engine to each of said wheels.

4. In a self-contained power axle for driving a motor vehicle, a hollow axle comprising a pair of axle halves with each said axle half comprising a cylindrical axle portion extending outwardly from a semi-cylindrical portion, said semi-cylindrical portions being joined together to form a single hollow axle having an open portion, an opposed piston engine disposed in a horizontal plane mounted on the open portion of said axle above the joined semi-cylindrical portions, wheels pivotally mounted on the outer ends of said single hollow axle, means within said axle for steering said wheels, drive shafts within said axle halves to transmit power from said engine to each of said wheels, and a covering enclosing said engine and said cylindrical axle portions to form a self-contained power axle unit whereby the vertical dimension is materially less than the horizontal dimension to permit low center of gravity vehicle bodies to be mounted on said power unit.

References Cited in the file of this patent

UNITED STATES PATENTS

| | | |
|---|---|---|
| 1,453,265 | Bird | May 1, 1923 |
| 1,926,692 | Tarbox | Sept. 12, 1933 |
| 1,947,213 | Meyer | Feb. 13, 1934 |
| 2,004,215 | Peterson | June 11, 1935 |
| 2,349,151 | Farnsworth | May 16, 1944 |
| 2,427,710 | Bush | Sept. 23, 1947 |
| 2,553,940 | Quantullo | May 22, 1951 |
| 2,591,219 | Vincent | Apr. 1, 1952 |

FOREIGN PATENTS

| | | |
|---|---|---|
| 661,094 | France | July 20, 1929 |